(12) United States Patent
Kurosawa

(10) Patent No.: US 6,773,176 B2
(45) Date of Patent: Aug. 10, 2004

(54) PRINTER, PRINTING SYSTEM, CONTROL METHOD FOR THESE PRINTER AND PRINTING SYSTEM, AND STORAGE MEDIUM

(75) Inventor: Hidenori Kurosawa, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 09/759,233

(22) Filed: Jan. 16, 2001

(65) Prior Publication Data

US 2001/0024584 A1 Sep. 27, 2001

(30) Foreign Application Priority Data

Jan. 18, 2000 (JP) ........................................ 2000-009364
Sep. 19, 2000 (JP) ........................................ 2000-283737

(51) Int. Cl.⁷ ................................................. B41J 3/42
(52) U.S. Cl. ............................. 400/76; 400/73; 400/62; 358/1.9
(58) Field of Search .............................. 400/76, 73, 70, 400/61, 62; 358/1.9, 1.12, 1.18

(56) References Cited

U.S. PATENT DOCUMENTS

| | | | | |
|---|---|---|---|---|
| 5,249,061 A | * | 9/1993 | Nagashima et al. | 358/296 |
| 5,638,183 A | * | 6/1997 | Hayashi et al. | 358/300 |
| 5,727,137 A | * | 3/1998 | LeClair et al. | 358/1.17 |
| 5,734,951 A | * | 3/1998 | Maekawa et al. | 399/169 |
| 5,768,486 A | * | 6/1998 | Sugaya | 358/1.17 |
| 6,052,203 A | * | 4/2000 | Suzuki et al. | 358/1.9 |
| 6,052,547 A | | 4/2000 | Cuzzo et al. | 399/79 |
| 6,120,197 A | | 9/2000 | Kawamoto et al. | 400/61 |
| 6,201,550 B1 | * | 3/2001 | Sakamoto | 345/442 |

FOREIGN PATENT DOCUMENTS

JP     5-19993     1/1993    ............ G06F/3/12

* cited by examiner

Primary Examiner—Charles H. Nolan, Jr.
Assistant Examiner—Minh Chau
(74) Attorney, Agent, or Firm—Fitzpatrick, Cella, Harper & Scinto

(57) ABSTRACT

To accurately setting a print charge on the basis of a color which is used actually at a stage to print data consisting of a mixture of color data and monochromatic data. It is possible to judge a color designated for printing by detecting color information from drawing processing information converted from the data and storing color designation information on the basis of the detected color information. Accordingly, a printing system is capable of setting a print charge accurately on the judged color.

17 Claims, 13 Drawing Sheets

FIG. 6
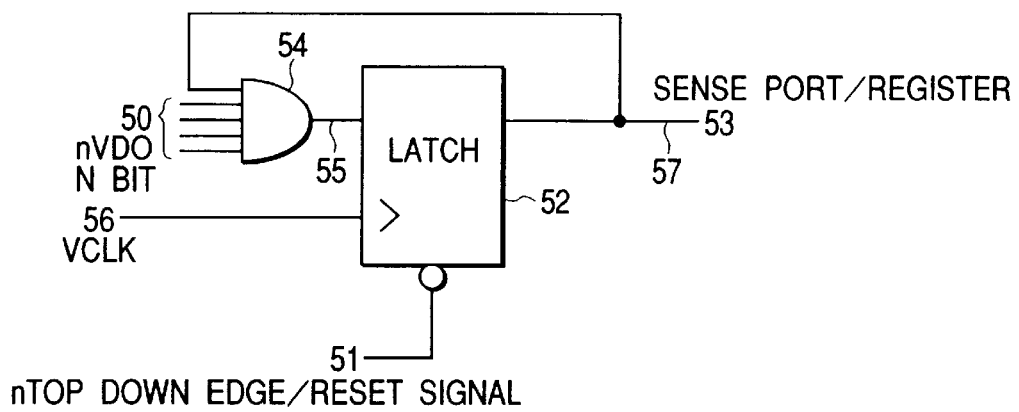
FIG. 7
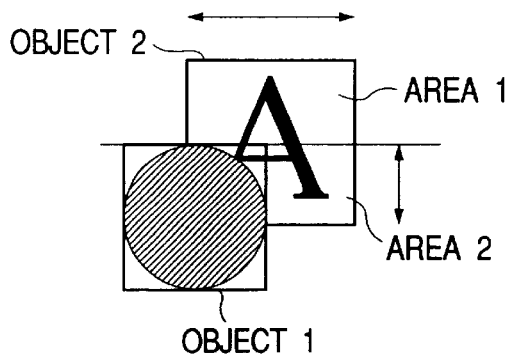
FIG. 8
| PRINT MODE | CHARGE |
|---|---|
| COLOR | ¥40 |
| MONOCHROME | ¥10 |
| COLOR PRINT PERCENTAGE | COLOR CHARGE RATE |
|---|---|
| 0 TO 5% | 10% |
| 5 TO 15% | 30% |
| 15 TO 30% | 60% |
| MORE THAN 30% | 100% |

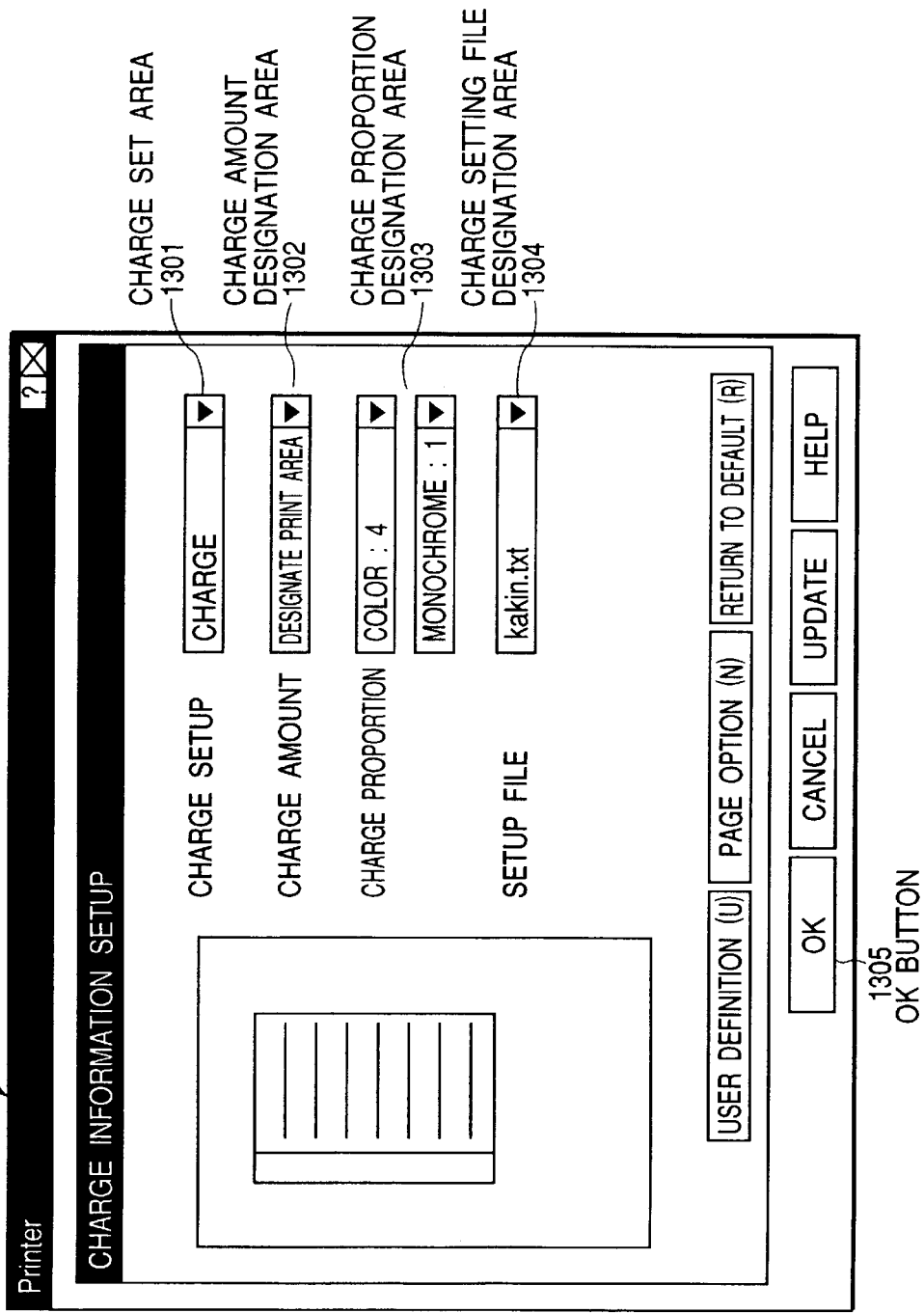

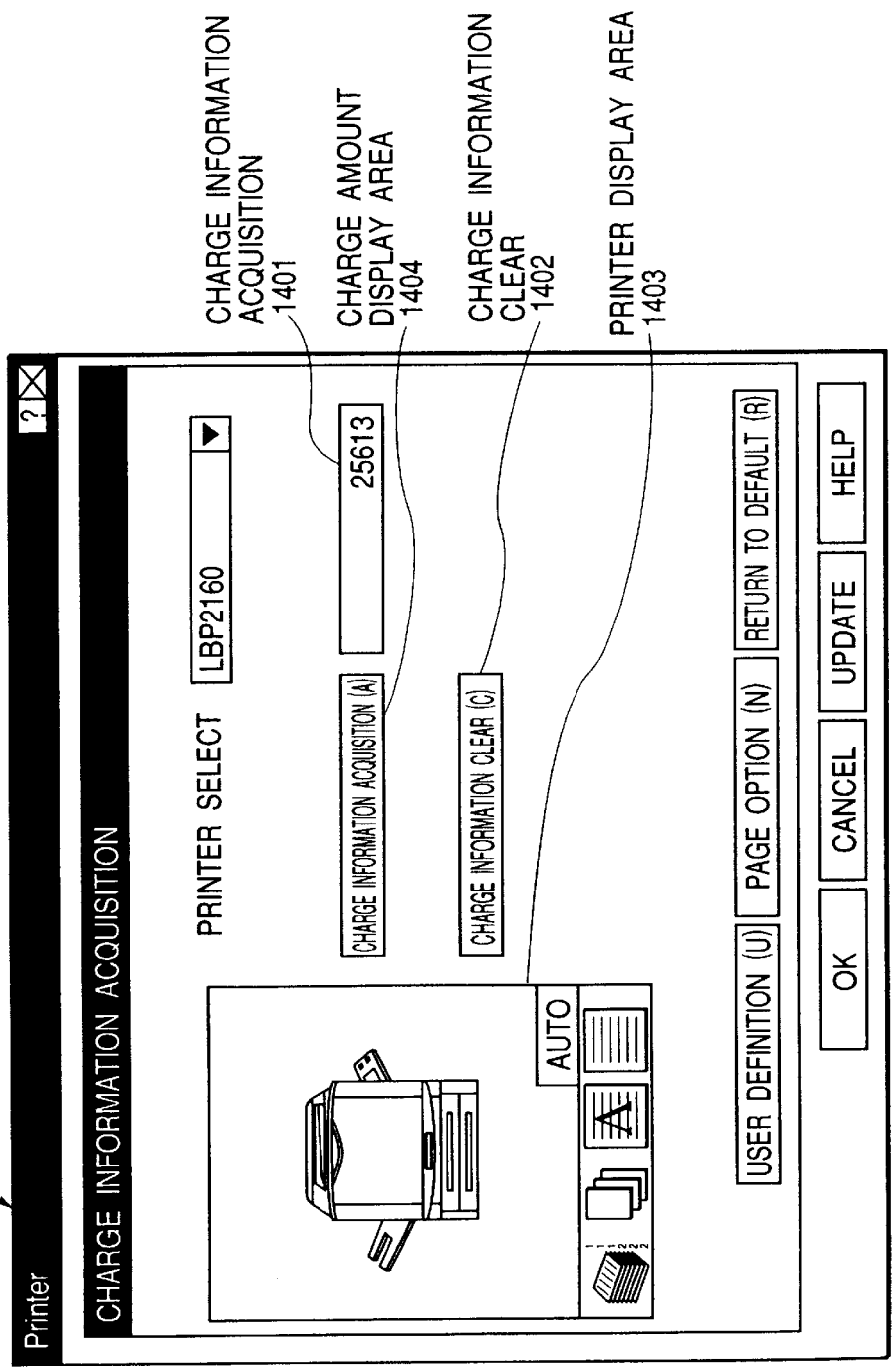

PRINTER, PRINTING SYSTEM, CONTROL METHOD FOR THESE PRINTER AND PRINTING SYSTEM, AND STORAGE MEDIUM

BACKGROUND OF THE INVENTION

1. Field of the Invention

The present invention relates to a printing system, a control method for the printing system and a storage medium.

2. Related Background Art

A conventional printing system which prints original data sent from a computer or the like with a printer poses a problem that the printing system deals all the original data as color pages even when monochromatic pages and color pages are mixed in the original data. As a result, the printing system poses a problem that charges for the color pages are set also for the monochromatic pages.

SUMMARY OF THE INVENTION

The present invention has been achieved to solve the above described problems and has an object to judge whether each page is a monochromatic page or a color page.

Furthermore, another object of the present invention is to calculate a ratio between a monochromatic portion and a color portion of original data.

The above described ratio is a ratio between a number of color pages and a number of monochromatic pages out of a plurality of pages or a ratio between a monochromatic portion area and a color portion area on a page.

Other objects and features of the present invention will become apparent from the following specification and drawings.

BRIEF DESCRIPTION OF THE DRAWINGS

FIG. 6 is a block diagram exemplifying a configuration of the print color detecting means of the printing system;

FIG. 7 is a diagram showing an overlapped condition of objects;

FIG. 8 is a diagram exemplifying a charge table;

FIG. 15 is a diagram exemplifying a user interface on a charge setting screen; and FIG. 16 is a diagram showing a user interface on a charge display screen.

DESCRIPTION OF THE PREFERRED EMBODIMENTS

Now, description will be made of embodiments of a printing system, a control method for the printing system and a storage medium according to the present invention.

Prior to description of a configuration of the printing system according to the embodiment, description will be made first of a configuration of a laser beam printer with reference to FIGS. 1 and 2 as a printer to which the embodiment is preferably applicable. It is needless to say that the embodiment (sections of an extension memory and an interface) is applicable not only to the laser beam printer but also other type printers such as an ink jet printer.

Figure 1:
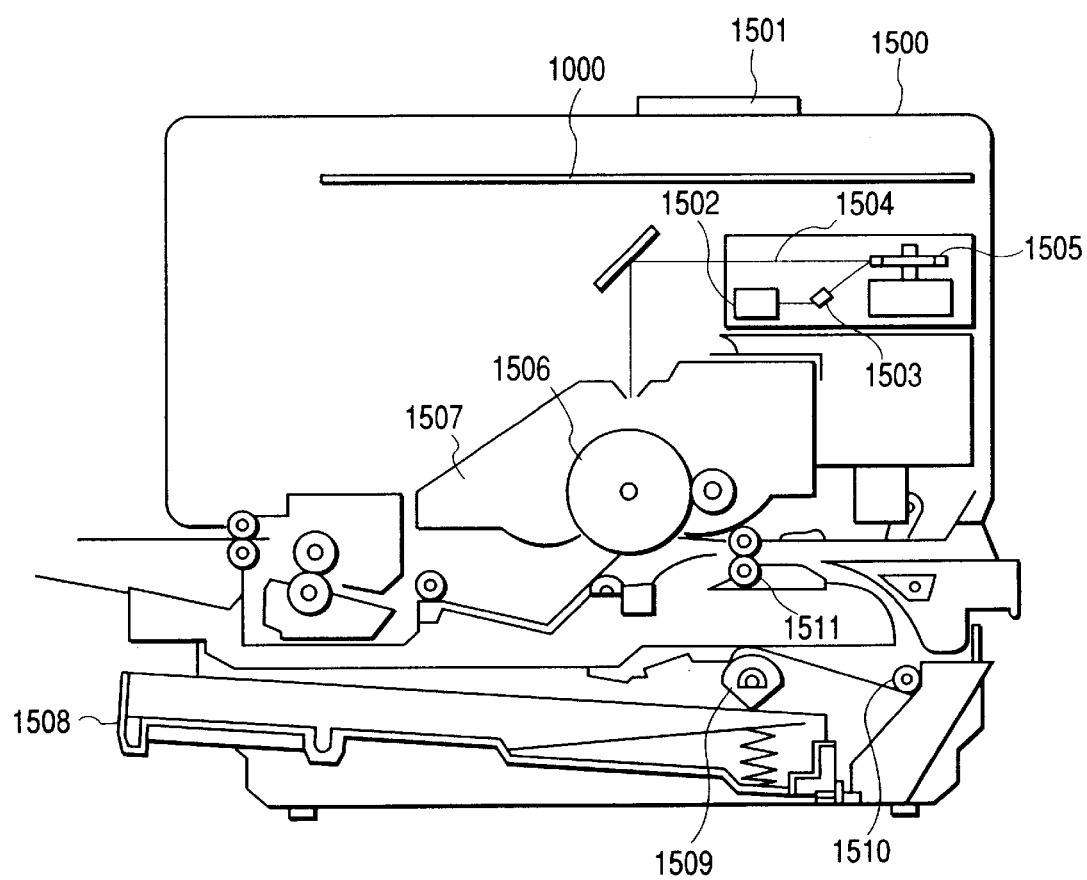
FIG. 1 is a sectional view showing a configuration of a printer.

FIG. 1 is a sectional view showing a laser beam printer (LBP) which is an example of printer to which the embodiment is applicable.

In FIG. 1, reference numeral 1500 denotes a LBP main unit which receives and stores input data (character codes and the like), form information, macro instructions and the like supplied from a host computer 3000 (see FIG. 2) connected outside, creates corresponding character patterns, form patterns and the like according to the information, and forms images on recording sheets and the like used as recording media.

Reference numeral 1501 denotes an operation unit on which operating switches, LEDs (light emitting diodes) displays and the like are arranged, and reference numeral 1000 denotes a printer control unit which controls the LBP 1500 as a whole and analyzes input data and the like supplied from the host computer 3000.

This printer control unit 1000 converts mainly the input data into video signals of corresponding character patterns and form patterns, and outputs these patterns to a laser driver 1502. The laser driver 1502 is a circuit for driving a laser 1503 and performs ON/OFF switching of a laser beam 1504 emitted from a semiconductor laser 1503 in correspondence to an input video signal.

The laser beam 1504 is deflected leftward and rightward by a rotating polygonal mirror 1505 to scan and expose an electrostatic drum 1506. Accordingly, an electrostatic latent image of the character pattern is formed on the electrostatic drum 1506.

This electrostatic latent image is developed with a developing unit 1507 disposed around the electrostatic drum 1506 and then transferred to a recording sheet. Used as this recording sheet is a cut sheet which is contained in a sheet cassette 1508 attached to the LBP 1500, taken into the apparatus and fed to the electrostatic drum 1506 with a sheet feeding roller 1509, a conveying roller 1510 and a conveying roller 1511.

Furthermore, the LBP 1500 is equipped with at least a card slot (not shown), and configured to allow an option font and a control card for a different language system (emulation card) to be connected in addition to a built-in font.

Figure 2:
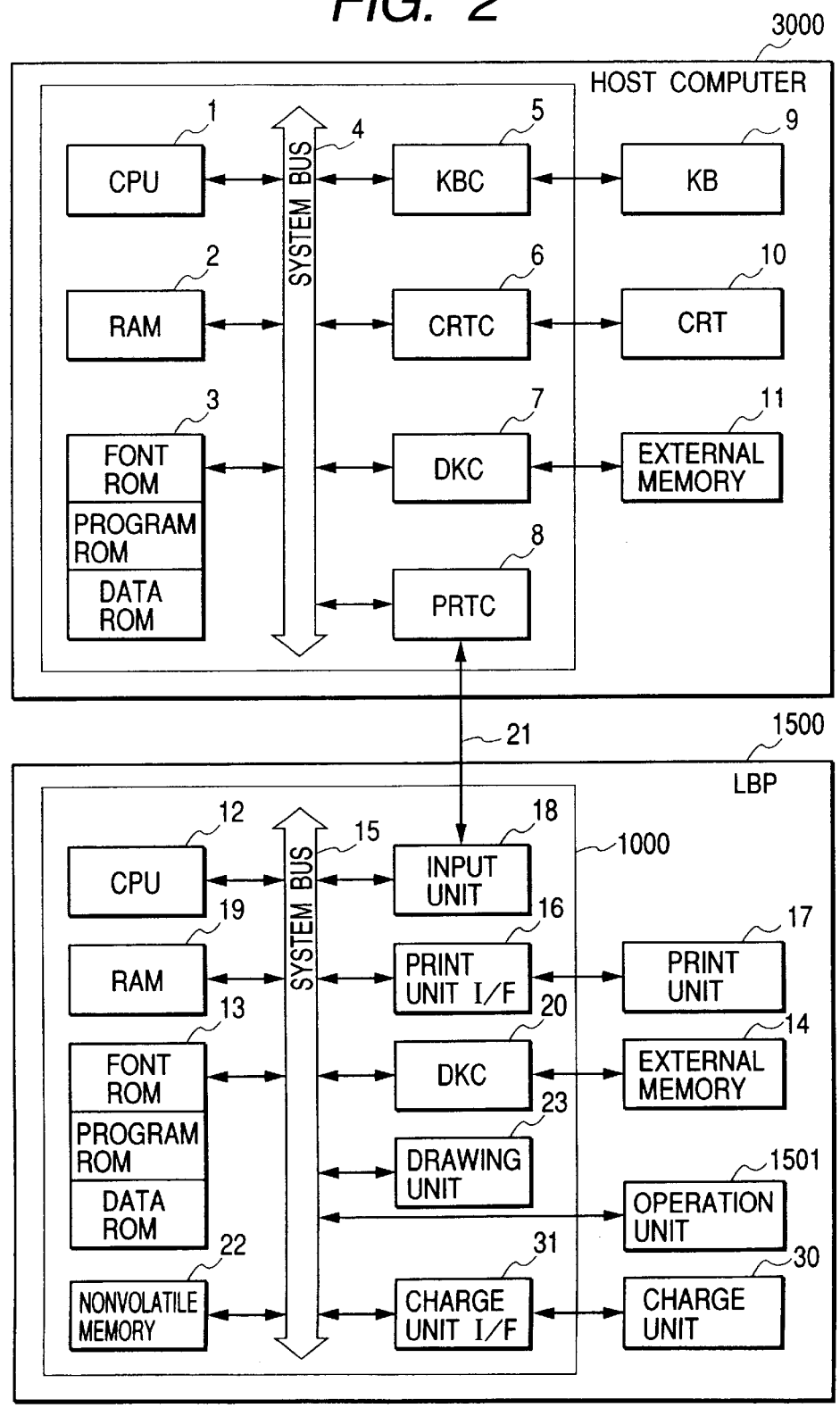
FIG. 2 is a block diagram descriptive of a configuration of a printing system.

FIG. 2 is a block diagram descriptive of a configuration of a printing system according to the embodiment of the present invention. This printing system may consist of a single appliance or a plurality of appliances so far as the printing system executes a function of the present invention. Furthermore, the present invention is needlessly applicable also to a system which executes processings through a network such as a LAN.

In FIG. 2, reference numeral 3000 denotes a host computer which is equipped with a CUP 1 for processing a document including a mixture of drawings, images, characters, tables (including table calculations) and the like on the basis of a document processing program or the like stored in a program ROM of a read only memory (ROM) 3, and controls devices connected to a system bus 4 collectively with the CPU 1.

The program ROM of the ROM 3 stores a control program for the CPU 1 and the like, a font ROM of the ROM 3 stores font data and the like to be used for the above described document processing, and a data ROM of the ROM 3 stores various kinds of data to be used for the document processing and the like.

Reference numeral 2 denotes a random access memory (RAM) which functions as a main memory, a work area and the like of the CPU 1. Reference numeral 5 denotes a key board controller (KBC) which controls key inputs from a key board 9 and a pointing device (not shown). Reference numeral 6 denotes a CRT controller (CRTC) which controls indications on a CRT display (CRT) 10.

Reference numeral 7 denotes a disk controller (DKC) which controls access to external memories such as a hard disk (HD), a floppy disk (FD) and the like which store a boot program, various kinds of application programs, font data, a user file, edit file and the like.

Reference numeral 8 denotes a printer controller (PRTC) which is connected to the LBP 1500 by way of a predetermined bidirectional interface 21 for executing control processing of communication with the LBP 1500. In addition, the CPU 1 executes development (lusterize) processing of an outline font, for example, of display information set on the RAM 2 to a RAM to enable WYSIWYG (what you see is what you get) on a CRT 10.

Furthermore, the CPU 1 opens various kinds of windows registered on the basis of commands designated by a pointing device (not shown) on the CRT 10 and executes various kinds of data processings.

In the LBP 1500, a CPU 12 collectively controls access to various kinds of devices connected to a system bus 15 on the basis of a control program stored in a program ROM of a ROM 13 and the like or a control program stored in the external memory 14 and the like, and outputs a video signal as output information to a print unit 17 connected by way of a print unit I/F 16.

Furthermore, the program ROM of the ROM 13 stores a control program and the like for the CPU 12. The font ROM of the ROM 13 stores font data and the like which are to be used for generating the above described output information, and the data ROM of the ROM 13 stores information and the like which are to be used by a host computer 3000 in case of a printer which is not equipped with the external memory 14 such as a hard disk.

In this embodiment, each program is configured by a computer system which consists of the CPU 12, the ROM 13 and a RAM 19.

The CPU 12 is configured to be capable of communicating with the host computer 3000 through a input unit so that information and the like in the LBP 1500 can be informed to the host computer 3000.

Reference numeral 19 denotes a RAM which functions as a main memory and a work area of the CPU 12, and is configured so that a memory volume of the RAM can be extended with an option RAM connected to an additional port (not shown). Used as the RAM 19 is an NVRAM or the like which is utilized as an output information development area and an environment data storage area. An access to the above described external memory 14 which is a hard disk (HD), an IC card or the like is controlled with a disk controller (DKC) 20.

The external memory 14 is connected as an option to store the font data, an emulation program, form data and so on. The printing system may be configured so that the printing system has at least an external memory 14 or more external memories and a plurality of external memories 14 storing an option font card, a program interpreting PDL of a different language system can be connected in addition to a built-in font. Furthermore, the printing system may be configured to have a non-volatile memory 22 which stores printer mode setting information from the operation unit 1501, for example, default sheet feeding cassette location, sleep time setting, print number information and the like.

In the printing system according to the embodiment which is configured as described above, image data (or document data) created by the host computer 3000 is stored into the RAM 19 by way of the input section 18 as input data 300 (see FIG. 3) which is converted by a printer drive installed in the host computer 3000 into PDL recognizable with the LBP 1500. While referring to the ROM 13, the CPU 12 consecutively analyzes the input data 300 stored in the RAM 19 and converts the input data into an intermediate code consisting of a plurality of display lists 33 having widths of 16, 32 and 48 bits (see FIG. 3) or a bit map memory suited for print processing. The display lists 33 contain information of a location, a size and the like predetermined for drawing, for example, "a character "A" is to be printed at a location of "X, Y" in a size of "Z"".

At a step to store the character data and the image data into the RAM 19, the RAM 19 which has so far been used as a page memory is divided into two page memories, which are defined as a character area and an image area respectively. When creating the intermediate code, a code obtained by developing the character data and a code obtained by developing the image data are stored in the respective areas of the RAM 19 on the basis of headers of the character data and the image data.

The RAM 19 generally has a memory area for a page and the division into the character area and the image area does not require addition of a memory, but when the printing system is operating in a memory saving mode for band processing, it is necessary to add a new memory 19.

A drawing unit 23 is configured by an application specific integrated circuit (ASIC) which consecutively reads and analyzes the intermediate code stored in the RAM 19 by DMA (direct memory access) on the basis of a drawing command from the CPU 12, thereby performing drawing processing. A register such as a print result register 38 (see FIG. 3) exists in the drawing unit 23.

Furthermore, a charge unit 30 receives charge information for setting a charge for printing of the image data by way of a charge unit I/F 31 and holds this information.

(First embodiment)

Figure 3:
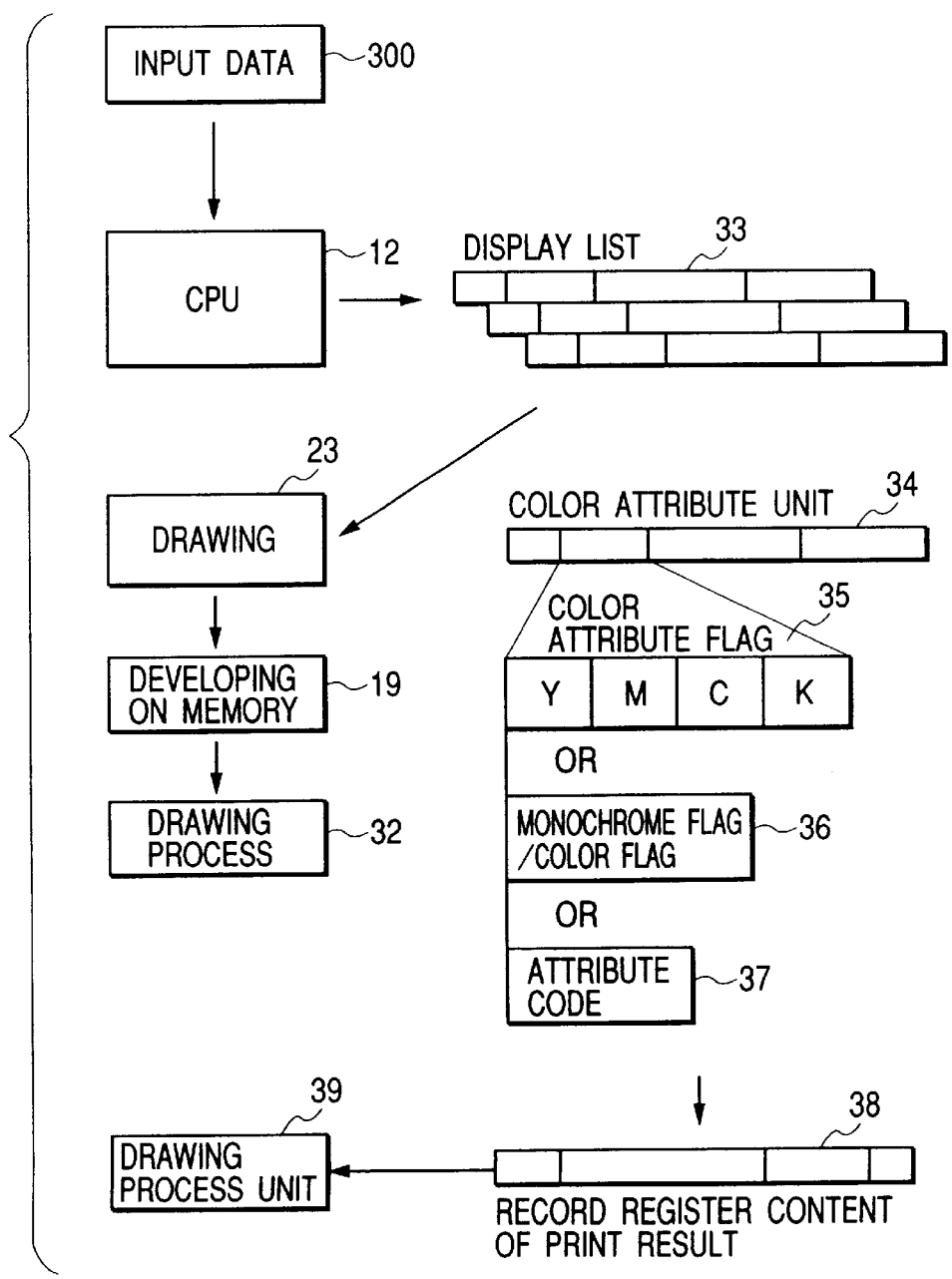
FIG. 3 is a diagram descriptive of processing contents of print color detecting means of the printing system.
Figure 4:
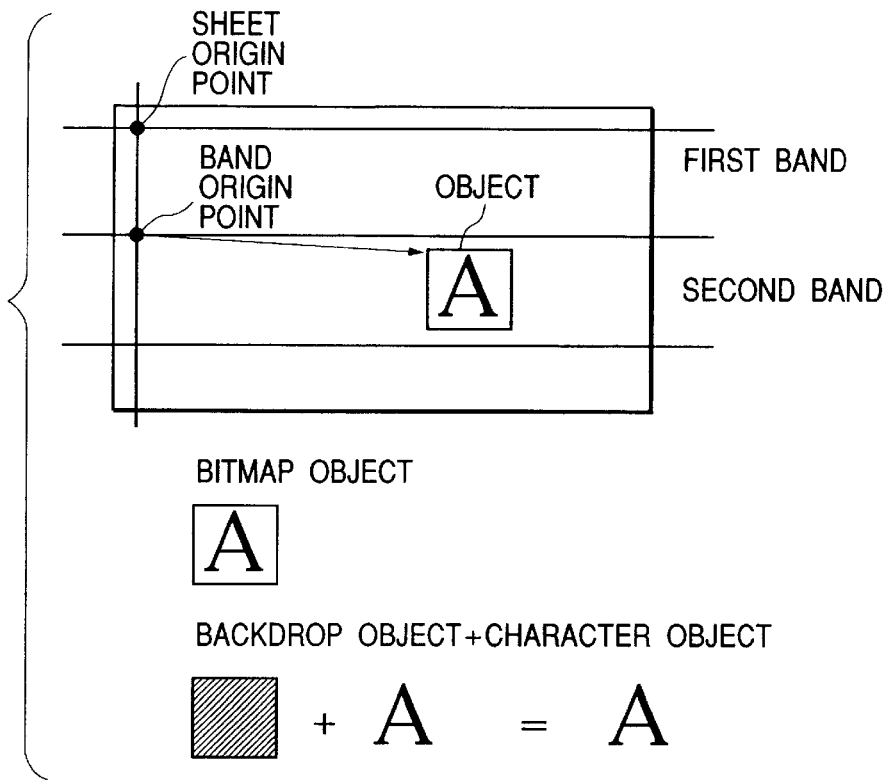
FIG. 4 is a diagram descriptive of band processing method.

Referring to FIGS. 3 and 4, description will be made of a printing system according to a first embodiment.

At a stage where a printer control unit 1000 receives at a certain degree the input data 300 which is input from the input unit 18, the printer control unit divides a page into several areas (referred to as bands) and performs a drawing processing for each band. This method is referred to as a band processing method which is known well as a method permits saving the RAM 19. When a large amount of data is to be processed, however, a page is processed as a whole without carrying out this method.

First, the CPU 12 divides the input data 300 into pages and creates the display lists 33 in a band unit. The display lists 33 contain information predetermined for drawing and color attribute units 34 for storing color information are prepared in several display lists 33.

Colors to be used for printing are expressed using four colors of Y, M, C and K (Yellow, Magenta, Cyan and black). At least one of Y, M and C is used in case of color print, whereas only K is used in case of monochromatic print.

When the input data includes a color print page, a display list is created for each of Y, M, C and K. Color information is stored in the color attribute units 34 of the display lists by a method (35) which designates a color by disposing an attribute flag for each of Y, M, C and K, a monochromate/color flag designation method (36) which judges monochromatic print or color print by disposing monochromate and color flags, a method (37) which designates colors with color codes representing color conditions or the like.

The CPU 12 passes the display lists 33 for a created band to the drawing unit 23.

According to a rule such as the color information stored in the display lists 33 passed from the CPU 12, the drawing unit 23 draws images on each line and develops a result in the RAM 19.

When the drawing unit 23 completes drawing processing for a band, the CPU 12 transmits a drawing result from the RAM 19 to a print unit 17 by way of a print unit I/F 16 and the print unit 17 performs printing on the basis of the drawing result.

The above described processings are repeated for each band to print images on a page. Though the first embodiment is configured to select a band as a printing range, a printing range may be arbitrarily selected.

Upon completing print on the page, print result information indicating a color of the print is stored in a record register content of print unit 38 disposed in the drawing unit 23 on the basis of color information which is stored in a color attribute unit 34 of the display lists 33 and designated by the any one of a color attribute flag 35, the monochromate flag/color flag method 36 or the attribute code method 37. For example, when at least one of Y, M and C or color information indicating a color print is stored in the color attribute unit 34 of the display lists 33 even once on a page, print result information indicating a color print is stored into the record register content of print unit 38.

The CPU 12 sends the print result information stored in the record register content of result 38 to a changing setting process unit 39 and the record register content of print result is cleared.

Furthermore, the CPU 12 may be configured to store the print result information on the basis of the color information not upon completing of the print on a page but upon completing a print processing of a color out of Y, M, C and K on the basis of the color information stored in the color attribute unit 34, and send the print result information to the changing setting process unit 39. In this case, the print result information in the record register content of print result 38 is cleared each time one of Y, M, C and K is printed.

Though the first embodiment is configured to have the record register content of print result 38 which is used for all Y, M, C and K collectively, a record register content of print result may be used for each color.

Though the first embodiment is configured to store the print result information in the record register content of print result 38, the printing system may be configured to store the color information in the record register content of print result and judge a print color on the basis of the color information.

The changing setting process unit 39 judges and sets a color print charge or a monochromatic print charge on the basis of the print result information received from the record register content of print unit 38.

Furthermore, the printing system may be configured to judge and set using any one of four kinds of charge setting methods which sets a monochromatic print charge when any one of Y, M, C and K is used, a dichromatic print charge when two colors are used, a trichromatic print charge when three colors are used and a color print charge when four colors are used.

Though the first embodiment is configured to judge and assess a charge with the changing setting process unit 39, the printing system may be configured to judge and assess a charge with the CPU 12 on the basis of the print result information stored in the record register content of print result 38 and transmit a judged result to the changing setting process unit 39.

The printing system according to the first embodiment which holds information of a color used for printing in the record register content of print unit 38 as described above is capable of judging whether each page is a monochromatic page or a color page and setting a reasonable charge in accordance with the judgement.

(Second embodiment)

Figure 5:
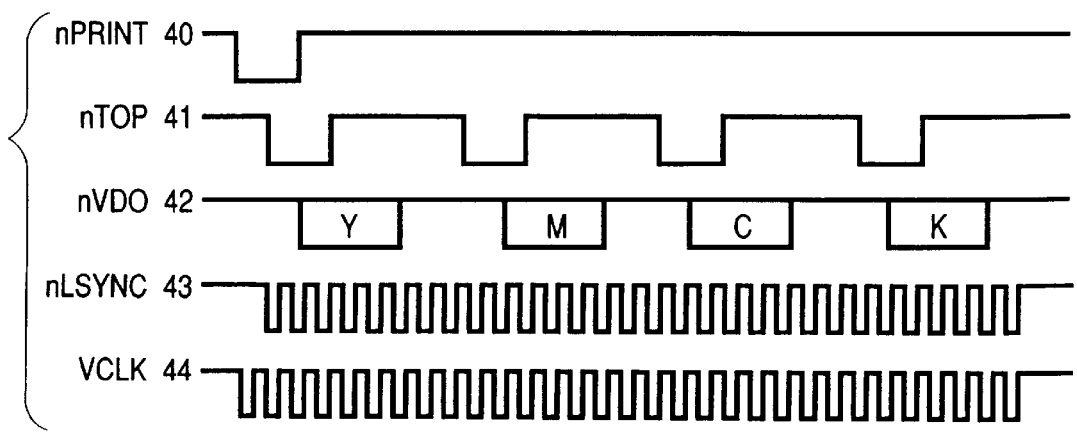
FIG. 5 is a timing chart at a printing time of the printing system.

FIG. 5 is a timing chart descriptive of a second embodiment.

The second embodiment is configured not to read out the color information stored in the color attribute unit 34 of the display list 33 but to acquire the color information by monitoring a print signal sent from the print unit I/F 16 to the print unit 17.

The timing chart shown in FIG. 5 describes a method which repeats a printing operation four times for printing in four colors Y, M, C and K. A principle remains unchanged for a tandem type color printing which prints the four colors at a time.

When preparations are made for printing, a printer control unit 1000 of an LBP 1500 sets an nPRINT signal 40 "true" for the print unit 17 and outputs VCLK44 which is a data synchronizing signal. Upon receiving the nPRINT signal 40, the print unit 17 sets "true" an nTOP signal 41 which is a vertical synchronizing signal and an nLYSNC signal 43 which is a horizontal synchronizing signal at definite intervals.

From a time when the nTOP signal is set "true", the printer control unit 1000 counts the nLSYNC signals 43 and outputs a video signal nVDO (N bits wide) 42 from a preset write start position to execute drawing of an image.

In order to monitor whether or not the image is printed in the colors Y, M, C and K, the second embodiment monitors whether or not the nVDO signal 42 is set "true" during printing in each color.

In other words, in order to monitor whether or not an nVDO signal 50 of N bits is varied in synchronization with a data synchronizing signal VCLK 56, a logical sum of the nVDO signal 50 is calculated with an OR circuit, a signal 55 of a calculation result is latched by a latch circuit 52 at each VCLK signal 56 and a signal 57 of a latch result is output to a sense port/register 53 as shown in FIG. 6. By reading the above described sense port/register 53 with a module disposed in the print unit I/F 16, it is possible to confirm whether or not a color is printed at a stage of an operation to print one of Y, M, C and K colors. The above described module may not be disposed in the print unit I/F 16, but connected to the print unit I/F.

The latch circuit 52 may be reset at a fall (an edge set true) of a down edge/reset signal 51 or a reset signal may be output from the CPU 12 at an identical timing.

The printing system according to the second embodiment is capable of confirming what color is used for printing by reading the sense port/register 53 into which a print signal is input as described above.

Upon completing print of one of the Y, M, C and K colors, the CPU 12 reads the sense port/register 53 with the module disposed in the print unit I/F 16 and sends print result information to the changing setting process unit.

Though the second embodiment is described as an example where the sense port/register is reset for each color, the printing system may be configured to use the sense port/register 53 or the latch circuit 52 for each color and read the sense port/register 53 with the module disposed in the print unit I/F 16 upon completing print on a page so that print result information of Y, M, C and K is sent collectively to the changing setting process unit 39. The print result information indicates color print when the information uses at least one of Y, M and C or monochromatic print when the information uses only "K".

On the basis of the print result information read from the sense port/register 53, the changing setting process unit 39 judges and sets a color print charge or a monochromatic print charge.

The printing system may be configured to set a charge by judging one of four methods which set a monochromatic print charge when one of the Y, M, C and K colors is used, a dichromatic print charge when two colors are used for print, a trichromatic print charge when three colors are used for print and a color print charge when four colors are used for print.

Though the second embodiment is configured to judge a kind of charge assessment with the changing setting process unit 39, the printing system may be configured to judge a kind of charge assessment with the CPU 12 on the basis of a read result of the sense port/register 53 and send a judged result to the changing setting process unit 39.

(Third embodiment)

A third embodiment will be described as an example where a charge is set dependently on a size occupied by a color print area on a page as a whole using the display list 33 in the printing system according to the above embodiment.

When data is to be created for drawing an object "A" as shown in FIG. 4, the drawing unit 23 reads the display list 33 from the RAM 19, analyzes content of the display list 33 and draws the object in a designated size (height and width) from a start point which is designated in an XY direction taking a band origin point (starting point of a band) as a reference. Not the band origin point but a sheet origin point or the like may be taken as a reference. When the drawing unit 23 judges that color information of a color print is stored in the color attribute unit 34 of the read display list 33, the CPU 12 writes information of a location and a size (height and width) of an image stored in the display list 33 into an area designated in the RAM 19.

Though the third embodiment is configured so that the drawing unit 23 judges whether input data is color data or monochromatic data on the basis of the color information stored in the color attribute unit 34 of the display list 33 and writes the information on the location and the size of the image stored in the display list 33 to the designated area in the RAM 19 to lessen a processing load on the CPU 12, the printing system may be configured so that the CPU 12 writes the size and the location of the image stored in the display lists 33 at a creation time or a processing time of the display lists 33.

Generally speaking, an object is roughly classified into two kinds: one being a bit map image which is a color image of itself and the other being an image consisting of overlapped "background information"+"character information" as shown in FIG. 4. Since both the images have an identical object size, however, information of a location and size of the bit map image are written into the display lists 33 with no modification or the "background information" of the overlapped image which is a color print area is written into the display lists 33.

Furthermore, the object "A" which is a color character consists of a combination of three colors of Y, M and C (or may consist of Y, M, C and K). When the color information is designated by a method which disposes a flag (35) for each color in the color attribute units 34 of the display lists 33, the drawing unit 23 must process the display lists 33 for each color and add sizes. Therefore, the drawing unit 23 writes size and location information over the RAM 19 each time it processes the display lists 33 for each color or performs a processing for no write of the information when identical location information is stored in the display lists 33. Furthermore, the color information may be stored in the color attribute unit 34 of a display list for a color only out of Y, M and C when the CPU 12 creates the display lists 33 which have identical location information.

When objects are overlapped with each other as shown in FIG. 7, overlapped portions are not recorded on the basis of the location information in the display lists 33.

This processing is repeated for each of the display lists 33, addition processing is repeated for each band, and upon completing processing for a page, a ratio of a color print area is calculated from a size of the page and the area of the color print area. Alternately, the printing system may be configured to calculate a ratio of a color print area in each band from height and width information of a band and a result obtained by adding the color information in the display lists 33, and finally calculate a ratio of a color print area on the page as a whole.

The third embodiment judges a ratio of a color charge by comparing the ratio of added color print areas with a charge table preliminarily stored in the ROM 13 or the RAM 19. Description will be made of the charge table in which print charges are set with reference to FIG. 8. An example shown in FIG. 8 has a charge system corresponding to print modes (color/monochromatic). Furthermore, the charge table is set so as to assess dependently on a ratio of a color print area, or "10%" of a color charge (¥40 in case of FIG. 8) in case of "0 to 5%".

From a result obtained by comparing a color print area with the charge table, the third embodiment creates charge setting information to set a charge for image data printing. The third embodiment sends the created charge setting information to the charge unit 30 by way of the charge unit I/F 31 and the charge unit 30 holds the charge setting information. The charge setting information may be stored in the RAM 19 or the non-volatile memory 22.

Furthermore, it is possible to send the charge setting information to the host computer 3000 by way of the input unit 18 on the basis of an instruction from the host computer 3000. The charge setting information can be sent by way of a network.

The third embodiment calculates a ratio occupied by a color print area on a print sheet as a whole from the color information stored in the color attribute unit 34 of the display list 33 as described above, thereby being capable of assessing a charge dependently on a color print area.

(Fourth embodiment)

Figure 9:
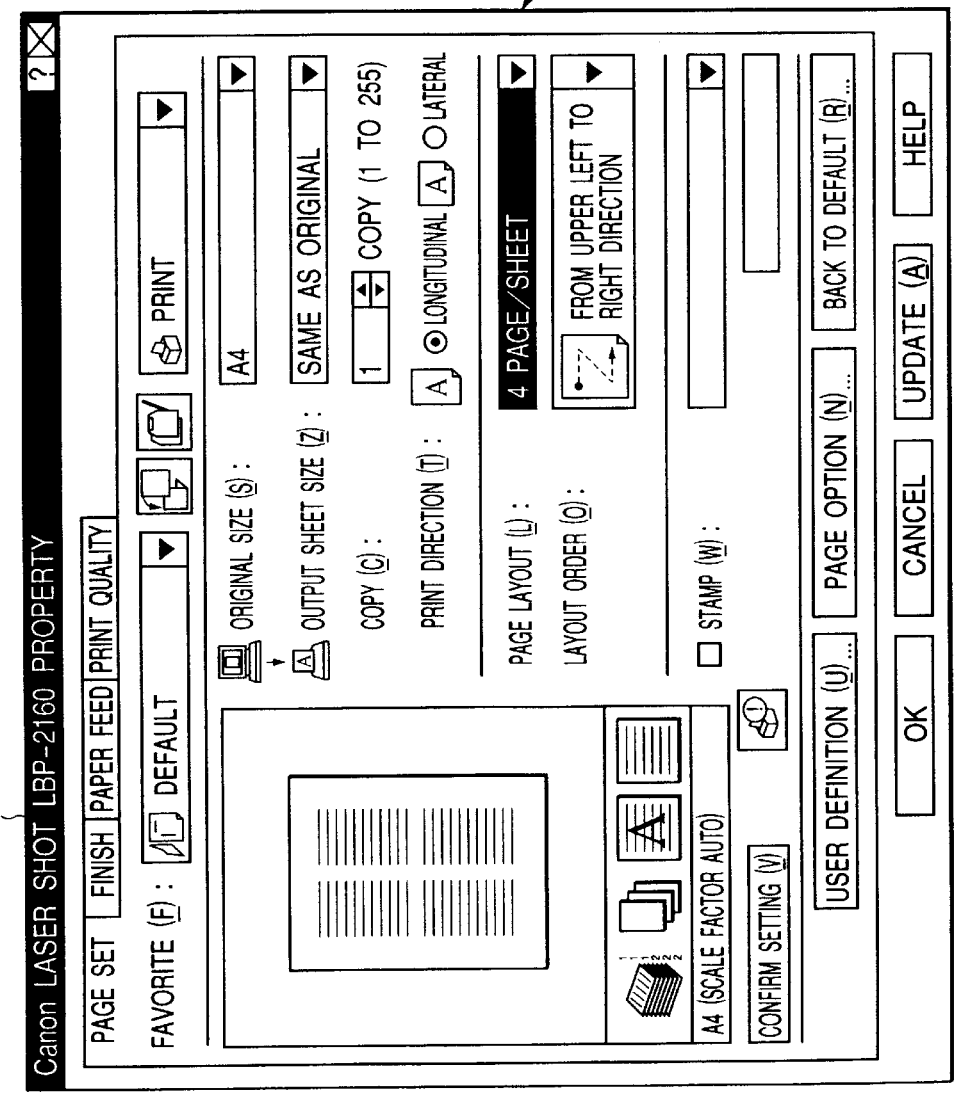
FIG. 9 is a diagram showing a user interface of a printer driver.
Figure 10:
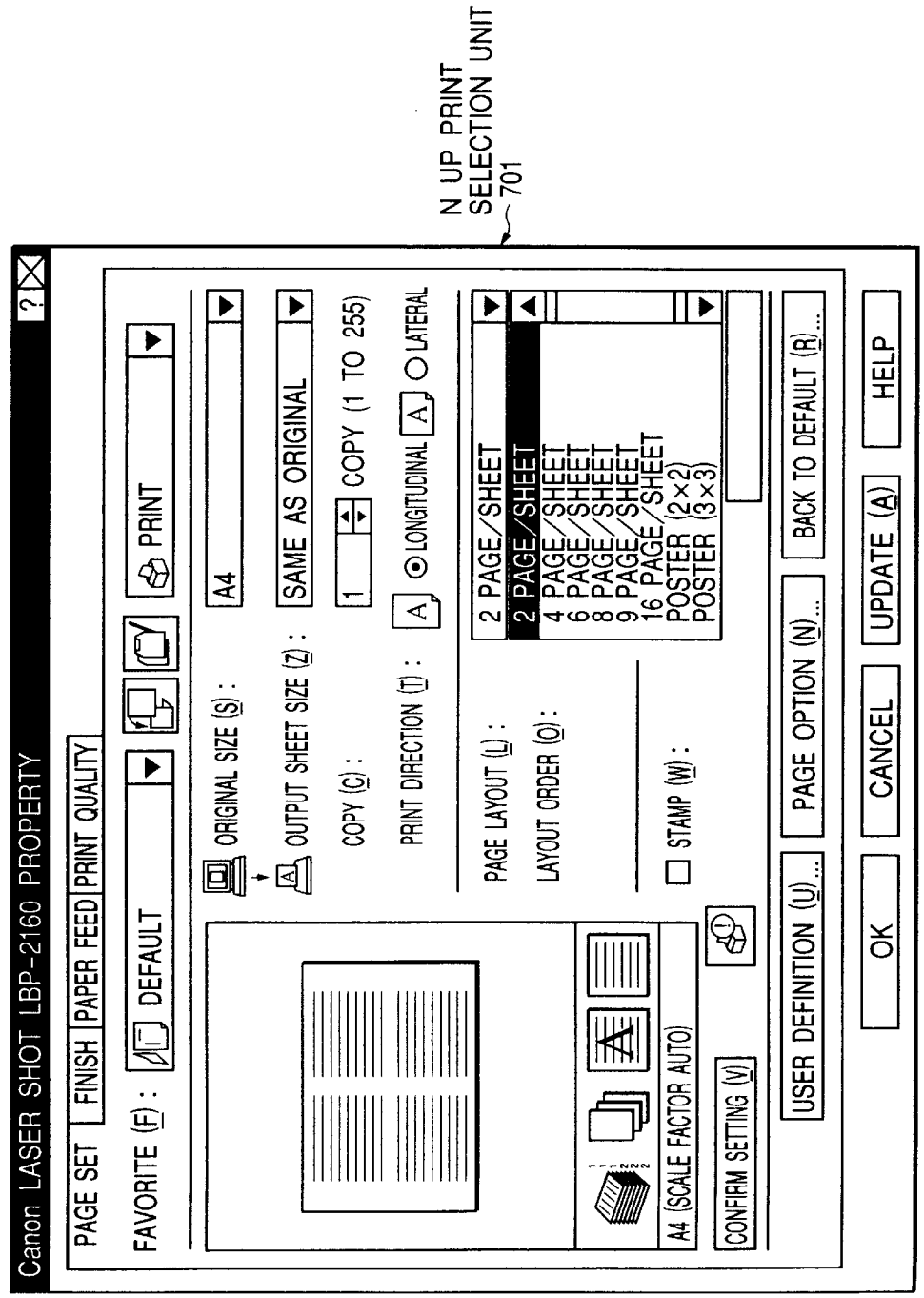
FIG. 10 is a diagram showing the user interface of the printer driver.

A printer driver is usually disposed preliminarily in the external memory 11 of the host computer 3000. The printer driver is software which creates the input data 300 by converting image data into PDL which is analyzable with the LBP 1500 at a stage to transmit image data including a writing and a figure created with an application device on the host computer 3000 to the LBP 1500. Using such a user interface as that shown in FIG. 9, the printer driver is displayed in a format for easy understanding by a user. The printer driver is specified, for example, to have an N up print select section 701 on a page layout set screen 700 which allows the user to select a number of pages to be printed on a sheet as shown in FIG. 10.

When an N up print is designated with the N up print select section with the N up print select section 701, the printer driver creates the input data 300 by modifying a layout for the image data into a format for the N up print and converting the image data into PDL, and transmits the input data 300 to the LBP 1500. Accordingly, no information for judging that data for N pages is collected on a sheet is not originally sent from the printer driver to the LBP 1500.

In the fourth embodiment, description will be made of a case where image data in which a monochromatic data and a color page are mixed is printed with a function of the N up print in the printing system according to the above described embodiment.

Figure 11:
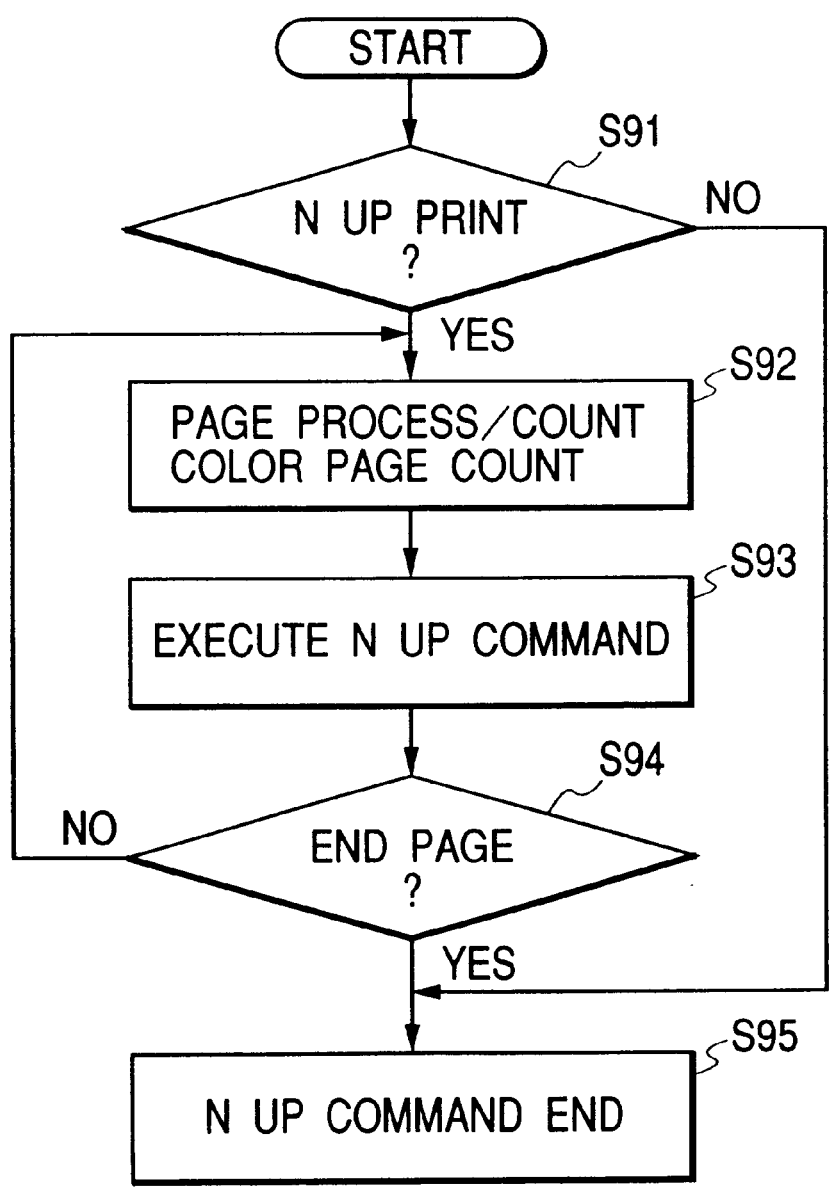
FIG. 11 is a flow chart showing a sequence of printing processings.

Referring to a flow chart shown in FIG. 11, description will be made of a sequence of operations which are performed by the printer driver when the N up print is designated in the fourth embodiment.

At step S91, the printer driver judges whether or not the N up print is designated. When the printer driver judges that the N up print is not designated, the printer driver terminates processing at step 95.

When the printer driver judges that the N up print is designated at the step S91, the printer driver judges a number of color print pages on a sheet while analyzing image data and modifying a layout at step S92. On the basis of a judged result, the printer driver creates the input data 300 by converting the image data into the PDL.

An N up command informs N up print information and the number of color pages. "ESC N:4; MONO: 1; COLO; 3" can be conceived as an example. This means that a monochromatic print page and three color print pages are contained on a sheet for the N up print of four pages/sheet.

At step S93, the input data 300 is sent to the LBP 1500 for each sheet and the N up command is informed to the LBP 1500.

At step S94, the printer driver judges whether or not a page is a last page in the image data. When the page is not the last page, the printer driver returns to the step S92 and repeats the above described processing. When the page is the last page, the printer driver proceeds to the step S95 to terminate the processing.

Figure 12A:
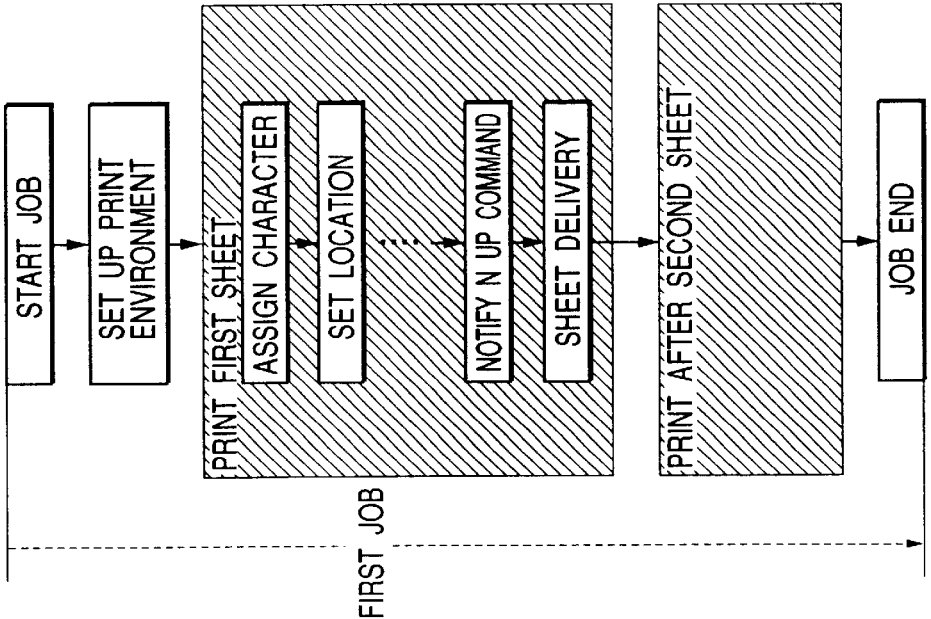
FIGS. 12A and 12B are flow charts descriptive of an example of a configuration of printing jobs.

Then, description will be made of a configuration of print jobs with reference to FIGS. 12A and 12B.

A first job consists of print instructions arranged in a predetermined order of instruction blocks and has a configuration of a start job instruction, set up print environment instruction, print first sheet instruction (assign character and drawing, set location, paper discharge and the like) and job end instruction.

Figure 12B:
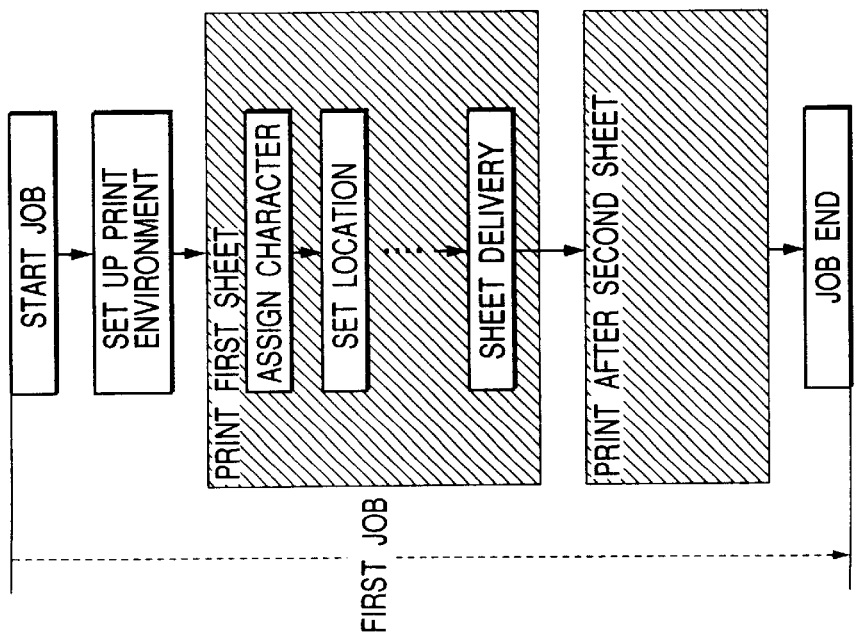

While the printer driver sends the input data 300 while analyzing the image data, the N up command peculiar to the fourth embodiment is sent to the LBP 1500 before a first sheet is discharged as shown in FIG. 12B.

When the LBP 1500 receives the N up command by way of the input unit 18 during a print processing, the LBP 1500 stores the N up command into the RAM 19. Upon completing the print processing, the LBP 1500 calculates a charge on the basis of a charge calculating formula preliminarily stored in the ROM 13 while referring to charge information. Conceivable as the charge calculating formula stored in the ROM 13 is, for example, "a charge for a color page×a number of color print pages÷N+a charge for a monochromatic page×a number of monochromatic print pages÷N".

The LBP 1500 sends a result of a calculated charge to the charge unit 30 by way of the charge unit I/F 31. Alternately, the LBP 1500 stores the result in the non-volatile memory 22 such as an NVRAM and transfers the result according to a request from the host computer 3000.

The fourth embodiment is configured so that the printer driver sends information of color pages included in N pages (the N up command) to the LBP 1500 (printing apparatus) at a stage of the N up print for each print sheet as described above, thereby being capable of assessing a charge dependently on a ratio between a number of color print pages and a number of monochromatic print pages included on a print sheet.

(Fifth embodiment)

Description will be made of a fifth embodiment where a charge table is not fixed but can be rewritten by reading the charge table stored in the data ROM 13 in the above described printing system into the non-volatile memory 22 constituted by NVRAM or the like at the time of activation of power supply or as necessary, and using the non-volatile memory 22 as the reference area referred to by the data ROM of the ROM 13.

When the ROM 13 is composed of a non-volatile ROM such as a flash ROM, an empty area of the flash ROM or a predetermined are may be used in place of the non-volatile memory 22. Furthermore, the charge table stored in the non-volatile memory 22 may be developed in the RAM 19 so that the charge table is referred to in the RAM 19.

Description will be made of the operation unit 1501 with reference to FIG. 13. An online lamp <1> displays a communication condition between the LBP 1500 and the host computer 3000. An LED stays lit while communication is possible. A print available lamp <7> also stays lit in this condition.

A double side lamp <2> indicates that double page print is possible. A discharge button <4> is to be depressed for printing data which is not output but accumulated in the LBP 1500 in order to prevent a condition where data transmission to the LBP 1500 is intercepted in the course of print, whereby the LBP 1500 cannot judge a page end and data is stacked. A sheet feed select button <3> is used for selecting a cassette from which sheets are to be fed. A sheet feeding cassette selected by a sheet feed select button <4> is indicated by an LED <5> which is lit. A job lamp <6> glows to indicate that a print job is being received. A message lamp <8> glows when an error message is displayed on a print available delivery tray <9>. Various kinds of settings are made using a utility button (10), a reset/go button (12), an operation mode button (11), a setup button (13) and the like.

Figure 14:
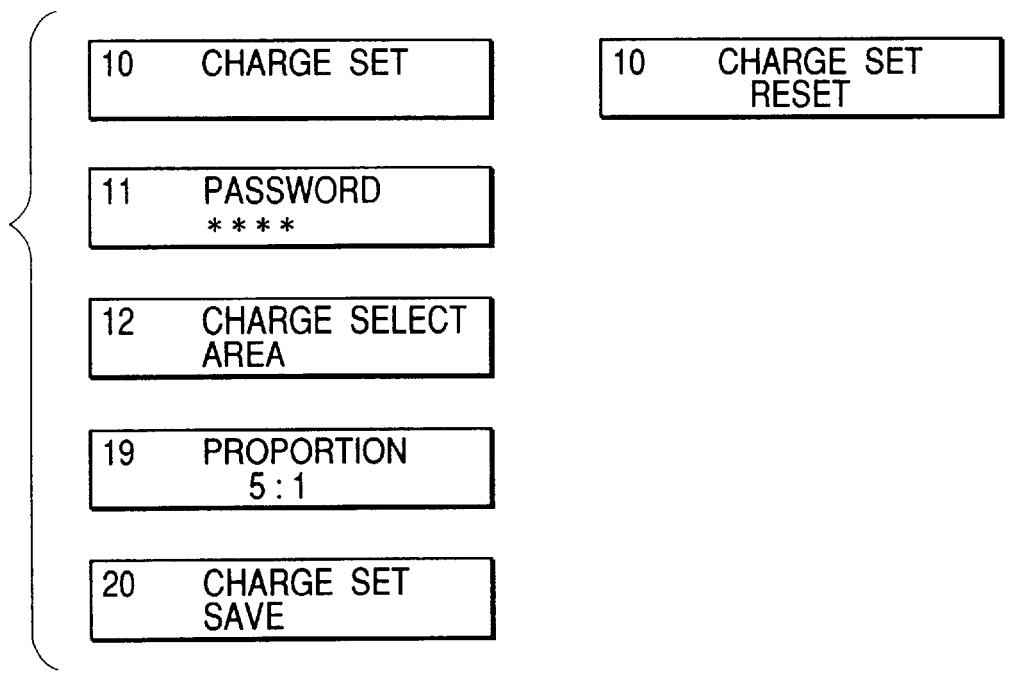
FIG. 14 is a diagram of a setting screen displayed on the operation unit of the printer.

Referring to FIG. 14, description will be made of operations for creating the charge table for setting a charge using the operation unit 1501 on a side of the LBP 1500.

Figure 13:
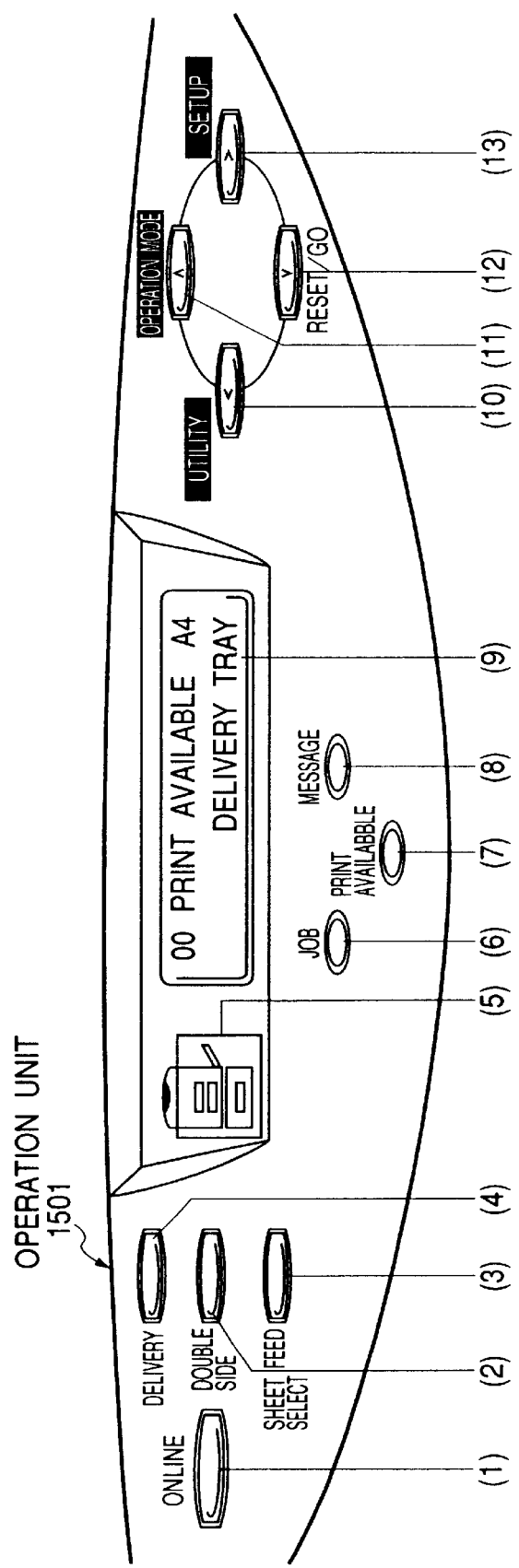
FIG. 13 is a diagram showing an operation unit of a printer.

First, a menu for charge setting is displayed on a print available delivery tray <9> by manipulating the buttons (10) through (13) shown in FIG. 13. Operations for creating the charge table for assessing charges are generally to be carried out by a serviceman or a manager. Accordingly, a certification is to be made by inputting a personal identification number (11 in FIG. 14). Furthermore, it is possible to prevent access to the menu for charge assessment from being made by general users when the menu for charge assessment is configured not as a menu to be displayed to the general users but as a hidden menu.

Then, a charge select area is set (12 in FIG. 14). A charge ratio between color print and monochromatic print is selected at 19 in FIG. 14. This area indicates a ratio between a charge for color print and a charge for monochromatic print, for example, a cost of ¥10 for the monochromatic print and a cost of ¥50 for the color print. Other details can be set on a screen for setting the charge select area.

Finally, the menu for charge setting is terminated by depressing an execute button at "charge setting maintained" (20 in FIG. 14).

The charge table which is set by the above described operations is accumulated in the RAM 19 each time the table is set. Upon completing the charge setting, the charge table accumulated on the RAM 19 is stored into the non-volatile memory 22.

When the charge table is reset, the charge table stored in the non-volatile memory 22 is deleted and a default charge table stored in the ROM 13 is written into the non-volatile memory 22. The printing system may be configured not to delete the charge table but write a charge table over the charge table.

Referring to FIG. 15 on the other hand, description will be made of operations for creating a charge table for setting charges by using the printer driver on a side of the host computer 3000.

A charge set screen 1300 is displayed by way of the printer driver which is preliminarily installed in the host computer 3000. Since charges are set by the serviceman or the manager, the charge set screen 1300 is not displayed so far as a log or a password is not input into the host computer 3000.

The charge set area 1301 sets whether or not a charge table is modifiable with the LBP 1500. A charge amount designation area 1302 sets a unit (area, kind or N up) which is to be used for setting a color charge rate. A charge proportion designation area 1303 determines a cost ratio between color print and monochromatic print. A charge setting file designation area 1304 designates a location of a setting file which describes contents of the charge table.

When the charges setting is completed and an OK button 1305 is manipulated, the printer driver sends a charge table rewrite instruction to the LBP 1500 by way of the PRTC 8 using a command peculiar to the LBP 1500. This charge table rewrite instruction may be sent by way of the PRTC8 or using a network port (not shown).

The LBP 1500 stores the charge table rewrite instruction once into the RAM 19 by way of the input section 18, and the CPU 12 interprets the charge table rewrite instruction using a processing program stored in the ROM 13 and rewrites the charge table stored in the non-volatile memory 22.

Referring to FIG. 16, description will be made of a method to acquire charge information from the LBP 1500 using the printer driver in the host computer 3000.

First, an LBP 1500 from which charge information is to be acquired is selected in a printer display area 1403. When a charge information acquisition (A) button 1401 is depressed, processing for acquiring the charge information is executed for the LBP 1500 selected in the printer display area 1403. Specifically, a charge information acquisition instruction is sent to the LBP 1500 by way of the PRTC 8 or a network port.

When a charge information clear (C) button 1402 is depressed, the printer driver sends a charge information clear instruction to a printer selected in the printer display area 1403. The LBP 1500 stores the charge information clear instruction into the RAM 19 by way of the input unit 18, and the CPU 12 interprets the charge information clear instruction using the ROM 13 and clears the charge information which is stored in the charge unit 30 by way of the charge unit I/F 31.

The LBP 1500 stores the charge information acquisition instruction into the RAM 19 by way of the input unit 18, and the CPU 12 interprets this charge information acquisition instruction using the ROM 13, acquires the charge information stored in the charge unit 30 by way of the charge unit I/F 31 and stores the charge information into the RAM 19. The CPU 12 sends the charge information stored in the RAM 19 to the host computer 3000 by way of the input unit 18 together with a charge information sending instruction to the host computer 3000.

The fifth embodiment is capable of modifying the charge table held by the LBP 1500 for setting charges using the operation unit 1501 of the LBP 1500 or the user interface displayed on the charge set reset display 10 of the host computer 3000. Accordingly, the fifth embodiment allows a manager of the printing system to flexibly modify charge settings.

(Other embodiments)

The present invention may be applied to a system which consists of a plurality of appliances (for example, a host computer, an interface appliance, a reader, a printer and the like) or an apparatus which consists of a single appliance.

Furthermore, an apparatus or a system which supplies software program codes for realizing functions of the above described embodiments to a computer in the apparatus or the system which is connected to various kinds of devices to operate the above described various kinds of devices so as to realize the functions of the above described embodiments and operates the above described various kinds of devices according to a program stored in the computer (CPU or MPU) of the apparatus or the system is also included within a scope of the present invention.

In this case, the above described software program codes realize the functions of the above described embodiments by themselves, and the program codes themselves and means for supplying the program codes to a computer, for example, storage medium storing the program codes compose the present invention. Usable as the storage medium for storing such program codes is, for example, a floppy disk, a hard disk, an optical disk, a photomagnetic disk, a CD-ROM, a magnetic tape, a non-volatile memory card, a ROM or the like.

Not only in a case where the functions described in the above described embodiments are realized with a computer which executes supplied program codes but also in a case where the functions of the above described embodiments are realized by the program codes in cooperation with an OS (operating system), application software or the like which is operating in a computer, the program codes are needlessly included in the embodiments of the embodiments of the present invention.

Furthermore, an apparatus or a system which stores supplied program codes into a memory disposed on a function extension board of a computer or in function extension unit connected to a computer, performs some or all of actual processings with a CPU or the like used on the function extension board or the function extension unit and realizes the functions of the above described embodiments by the processings is also included within the scope of the present invention.

What is claimed is:

1. A printing system for printing data, comprising:
   a converter, arranged to convert the data into drawing processing information;
   a detector, arranged to detect color information regarding a color from the drawing processing information;
   storage arranged to store the color information; and
   accounting means for accounting a printing charge on a basis of the color information stored in said storage.

2. The system according to claim 1, wherein the color information is detected by said detector from the drawing processing information which is converted into a video signal.

3. The system according to claim 1, wherein the color information is any one of a flag indicating a color component, a flag indicating monochromatic/color and a code indicating a color condition.

4. The system according to claim 1, wherein the data is converted into a plurality of items of drawing processing information, and
   said storage stores color information contained in the drawing processing information.

5. The system according to claim 4, wherein said storage stores the color information for each of the plurality of items of drawing processing information composing a page of the data.

6. The system according to claim 5, wherein said storage stores the color information for each sheet on the basis of the color information for a plurality of pages contained on a sheet when a plurality of pages are to be printed on a sheet.

7. The system according to claim 1, further comprising communication means for transferring information of the printing.

8. The system according to claim 1, wherein the printing charge is accounted on the basis of preliminarily set information regarding the printing charge.

9. The system according to claim 8, wherein the preliminarily set information is modifiable.

10. The system according to claim 9, wherein the preliminarily set information is modifiable by an external apparatus.

11. The system according to claim 1, wherein said detector detects color information related to a color designated for printing the data for each page of the data.

12. The system according to claim 1, wherein said detector detects color information related to a color designated for printing the data and area information of an area printed using the designated color, and said storage stores the color information and the area information.

13. A control method for controlling a printing system for printing data, comprising the steps of:
   converting the data into drawing processing information;
   detecting color information regarding a color from the drawing processing information;
   storing the color information; and
   accounting a printing charge on a basis of the color information stored in said storing step.

14. A storage medium for controlling a printing system for printing data, comprising a program for executing:
   converting the data into drawing processing information;
   detecting color information regarding a color from the drawing processing information; and
   storing the color information; and
   accounting a printing charge on a basis of the color information stored in said storing the color information.

15. A printing system for printing data comprising:
   a detector arranged to detect color information regarding a color from the data;
   storage arranged to, in response to a plurality of pages being printed on one sheet, store the color information of each sheet on the basis of the color information of the plurality of pages included on the sheet; and
   accounting means for performing accounting for a print charge on a basis of the color information stored in said storage.

16. A control method for controlling a printing system for printing data comprising the steps of:
   detecting color information regarding a color from the data;
   storing, in response to a plurality of pages being printed on one sheet, the color information of each sheet on the basis of the color information of the plurality of pages included on the sheet; and
   performing accounting for a print charge on a basis of the color information stored in said storing step.

17. A storage medium for controlling a printing system for printing data, comprising a program for executing a control method of:
   detecting color information regarding a color from the data;
   storing, in response to a plurality of pages being printed on one sheet, the color information of each sheet on the basis of the color information of the plurality of pages included on the sheet; and
   performing accounting for a print charge on a basis of the color information stored in said storing step.

* * * * *